(12) United States Patent
Oldani

(10) Patent No.: US 8,034,162 B2
(45) Date of Patent: Oct. 11, 2011

(54) DUST FILTRATION IN AN AUTOMATED FIBER PLACEMENT PROCESS

(75) Inventor: Tino Oldani, Rockford, IL (US)

(73) Assignee: Ingersoll Machine Tools, Inc., Rockford, IL (US)

(*) Notice: Subject to any disclaimer, the term of this patent is extended or adjusted under 35 U.S.C. 154(b) by 560 days.

(21) Appl. No.: 12/233,018

(22) Filed: Sep. 18, 2008

(65) Prior Publication Data

US 2009/0071329 A1  Mar. 19, 2009

Related U.S. Application Data

(60) Provisional application No. 60/973,340, filed on Sep. 18, 2007.

(51) Int. Cl.
  *B03C 3/36* (2006.01)

(52) U.S. Cl. ........ 95/78; 55/385.2; 55/471; 55/DIG. 18; 95/273; 96/25; 96/63; 156/173; 156/174; 156/437

(58) Field of Classification Search ............... 55/385.1, 55/385.2, 467, 471–473, DIG. 18; 95/26, 95/69, 70, 78, 273, 284; 96/25, 55, 57, 58, 96/60, 63, 74; 156/166, 173, 174, 433, 436, 156/437; 264/257, 258; 425/392, 393
See application file for complete search history.

(56) References Cited

U.S. PATENT DOCUMENTS

| | | | | |
|---|---|---|---|---|
| 1,812,412 A * | 6/1931 | Olson | ................ | 55/297 |
| 2,924,062 A * | 2/1960 | Sutcliffe | ................ | 57/304 |
| 4,268,282 A * | 5/1981 | MacKenzie | ................ | 96/58 |
| 5,279,629 A * | 1/1994 | Stueble | ................ | 95/284 |
| 6,428,611 B1 * | 8/2002 | Andolino et al. | ................ | 96/25 |
| 6,572,719 B2 * | 6/2003 | Fecko et al. | ................ | 156/180 |
| 6,679,416 B2 * | 1/2004 | Lin | ................ | 228/57 |
| 7,527,664 B2 * | 5/2009 | Jackson | ................ | 55/385.2 |
| 2005/0039600 A1 * | 2/2005 | Lim et al. | ................ | 95/273 |
| 2005/0132681 A1 * | 6/2005 | Chu | ................ | 55/471 |
| 2005/0236735 A1 | 10/2005 | Oldani et al. | | |
| 2007/0044899 A1 | 3/2007 | Tingley | | |
| 2007/0187021 A1 | 8/2007 | Oldani et al. | | |

FOREIGN PATENT DOCUMENTS

JP  2-217735 A * 8/1990

OTHER PUBLICATIONS

Russell Devlieg, Kyle Jeffries & Peter Vogeli, High-Speed Fiber Placement on Large Complex Structures, article, SAE International, 2007, 2007-01-3843, 5 pages, p. 1-5.

* cited by examiner

*Primary Examiner* — Richard L Chiesa
(74) *Attorney, Agent, or Firm* — Reinhart Boerner Van Deuren P.C.

(57) ABSTRACT

A method and apparatus are provided for substantially containing dust generated along a fiber tow path extending from a creel to a compression roller in an automated fiber placement machine, by enclosing substantially all of the path of the fiber tows between the creel and the compression roller within a barrier that is substantially impermeable to dust. A dust collection apparatus may have a porous media and/or utilize an electrostatic charge for entrapping the dust.

24 Claims, 6 Drawing Sheets

DUST FILTRATION IN AN AUTOMATED FIBER PLACEMENT PROCESS

CROSS-REFERENCE TO RELATED PATENT APPLICATIONS

This patent application claims the benefit of U.S. Provisional Patent Application No. 60/973,340, filed Sep. 18, 2007, the entire teachings and disclosure of which are incorporated herein by reference thereto.

FIELD OF THE INVENTION

This invention relates generally to automated fiber placement, and more particularly to containment and filtration of airborne dust and vapors produced during an automated fiber placement process.

BACKGROUND OF THE INVENTION

In the last twenty years, the automated fiber placement manufacturing process has undergone substantial growth, primarily due to improved design and manufacturing processes, as well as an increasing number of applications. The incorporation of fiber materials in sports equipment such as golf clubs, tennis rackets or snow skis has shown others how these materials might also be appropriate for automobile hoods and fenders, recreational marine vessels or, aircraft wings or bodies and aerospace applications.

Regardless of composition, carbon fibers or carbon fiber materials, in particular, hold certain common negative aspects that accompany the handling or manufacturing activities involving carbon fiber materials. The three most common areas of concern in the handling of carbon fibers are dust inhalation, skin irritation, and the effects of fibers on electrical equipment. Some carbon fiber is composed of many extremely light, thin strands, containing mainly carbon embedded in an epoxy resin. Alternatively, some carbon fiber may be composed of many extremely light, thin strands, containing mainly carbon without being embedded in an epoxy resin However, carbon fibers by their nature, are somewhat "flinty" and tend to give off small, free floating particulate "flakes," while being incorporated into a manufactured product. These "flakes" are generally indiscernible to the naked eye; thus, they are commonly referred to as "dust".

When parts are produced with an automated fiber placement machine, multiple tows of carbon, fiber glass, etc., must travel over somewhat torturous path from a refrigerated creel to the compression roller of a fiber placement head. It is known that during such an automated fiber placement process, minute pieces of fiber and resin may come loose from the tows and form a "dust" of particles which may possibly cause irritation to the skin of a machine operator and may possibly be potentially harmful if inhaled by that operator, or others, in substantial quantities. Also, non-resin embedded flakes or dust may accumulate on internal mechanism or elements of the automated carbon fiber placement machine and become electrostatically charged after a time. Such polarization has been determined significantly contributory to static electrical arcing within components that ruin the component or temporarily suspend the machine's operation.

In the utilization of an automated carbon fiber placement machine, an operator may come into direct physical contact with the pre-impregnated strands of carbon fiber material. More specifically, many manufacturing processes utilizing carbon fibers are accomplished through what is commonly known as "hand lay-up" process. This process involves the direct application of the carbon fiber material or "tows," by an individual immediately adjacent to and directly manipulating or controlling the lay-up application of the carbon fiber tows onto a mold. The "dust" may also cause malfunction or operating problems with the fiber placement machine apparatus if it is allowed to accumulate around bearings or other moving parts. Generally, as a precautionary step, operators of such fiber placement apparatus may spend substantial amounts of non-productive or "down-time" cleaning various surfaces and components of the apparatus to offset the adverse effects of such dust accumulation.

Additionally, the dust particles may in some cases, have an electrostatic charge, which may cause the particles to be drawn into unsealed electric motors and/or control electronics. A number of manufacturers of carbon fiber material acknowledge that completed carbon fibers are good conductors of electricity. Accordingly, it is desirable to provide a method and apparatus for containing and removing the dust particles generated during the fiber placement process. Another negative aspect of carbon fiber manufacture is the possibility of skin irritation resulting from contact with carbon fiber dust.

Therefore, what is needed then is an improved methodology for the carbon fiber placement manufacturing process that removes or substantially reduces the presence of the carbon fiber dust during that process and thus, removes or substantially reduces the level of risk to those individuals in the immediate presence of the carbon material.

BRIEF SUMMARY OF THE INVENTION

The invention provides a method and apparatus for substantially containing dust generated along a fiber tow path extending from a creel to a compression roller in an automated fiber placement machine, by enclosing substantially all of the path of the fiber tows between the creel and the compression roller within a barrier that is substantially impermeable to dust.

A dust impermeable barrier or shroud, according to the invention, may define a dust retention plenum therewithin, with a method or apparatus, according to the invention, further including a dust collection apparatus operatively connected to the plenum within the dust impervious barrier. In some forms of the invention, the dust collection apparatus may include a filter having a porous media for entrapping the dust. In some forms of the invention, the dust collection apparatus may utilize an electrostatically charged filter for entrapping the non-resin embedded dust. The dust collection apparatus in some forms of the invention may include both a porous media and utilize an electrostatic charge for alternatively entrapping either non-resin embedded or resin embedded dust at the operator's discretion.

In a method or apparatus according to the invention, the dust collection apparatus may include a fan or other means for producing an air flow from the plenum enclosed by the dust impervious barrier through an electrostatically charged filter, or single filter element, or multiplicity of filters, in proximity to the refrigerated creel assemblies and fiber tows being utilized with an automated fiber placement apparatus operating in conjunction with a rotatable mandrel, or stationary tool configuration. The plenum within the barrier member may include an air inlet in fluid communication with ambient air around the barrier, with the inlet being disposed adjacent the compression roller. In some forms of the invention, the collection apparatus is disposed adjacent to the creel.

In some forms of a method, according to the invention, carbon fiber flakes or dust are evacuated from a carbon fiber placement machine tool head by providing a flow of air over a main roller and fiber placement delivery system of the fiber placement machine tool head, with an apparatus which includes: a refrigerated spool carrier attached to a positioner cradle that moves along at least two axes; a carbon fiber tow path and redirect apparatus position between the refrigerated spool carrier and the automated fiber placement head; an electrostatic dust removal device positioned immediately adjacent to the fiber tow path prior to the tows reaching the automated fiber placement head apparatus; with the fiber placement head apparatus having at least one free upper direction wheel, at least one motorized roller, at least one feed roller, and at least one mechanism for cutting or severing the carbon fiber tows according to an attendant computer software design instruction.

A method or apparatus, according to the invention, may be utilized with an automated fiber placement apparatus operating in conjunction with a rotatable mandrel. The invention may also be practiced, in some forms, with a stationary tablet mold configuration.

One advantage of this invention is to provide an improved method and apparatus for the application of carbon fiber tows in either an automated machine tool or hand lay-up process that substantially reduces if not completely removes the presence of the carbon fiber dust.

Another advantage of this invention to provide this method and apparatus in a product configuration that may be incorporated into certain automated carbon fiber placement machine tools without limiting or restricting the range of the machine tool head motion.

It is another advantage of this invention to provide this method and apparatus in a product configuration that may be incorporated into hand lay-up carbon fiber placement machine tools without limiting or restricting the range of the machine tool head motion or being unmanageable by the operator.

Another advantage of this invention is to provide this method and apparatus in a product configuration that does not require extensive knowledge or maintenance in operation while simultaneously providing effective carbon fiber dust reduction or removal.

Another advantage of this invention is to provide a method and apparatus in a product configuration that reduces the need for scheduled cleaning or maintenance to assure efficient operation, thus increasing the amount of operation time that may be dedicated toward performing profitable manufacturing operations.

A further advantage of this invention is to provide this method and apparatus in a product configuration that does not retard or reduce the rate of speed or efficiency of the placement of the carbon fiber tows onto a mold.

The collection and evacuation of carbon fiber dust through an atmospheric evacuation process may rely on the physical density of the carbon fiber dust while it is suspended in the immediate atmosphere. The collection of the carbon fiber dust through an electrostatic device may also, or alternatively, rely upon the electrical conductivity of the carbon fiber dust.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
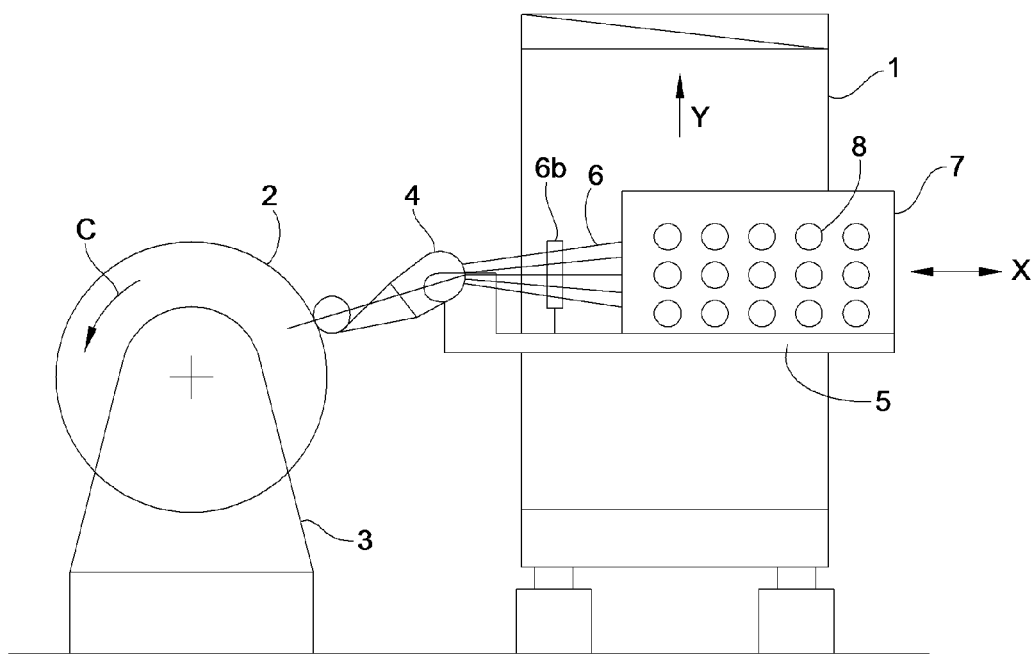
FIG. 1 is a perspective illustration of a first exemplary embodiment of an apparatus for automated fiber placement of a tool surface of a mandrel according to the invention.

FIG. 1 shows an exemplary embodiment of the invention in the form of the apparatus of a multi-axes carbon fiber placement machine incorporating a horizontal ram for the placement of carbon fiber tows on a reciprocating rotatable mandrel mold device. The apparatus as shown includes a large envelope positioner 1 immediately adjacent to the mandrel 2 carrying the part mold to be formed and mandrel headstock and tailstock 3 that rotate the mandrel 2 along a rotary axis. The apparatus includes a positioner cradle 5 that moves along both an X and/or Y axis independently or simultaneously and that holds the refrigerated spool (creel) carrier 7, adjacent to the carbon fiber tow 6 path and the carbon fiber tow support redirect 6b. The carbon fiber tows 6 proceed to the automated fiber placement machine tool head 4 for application to the mold and form as designed.

Figure 2:
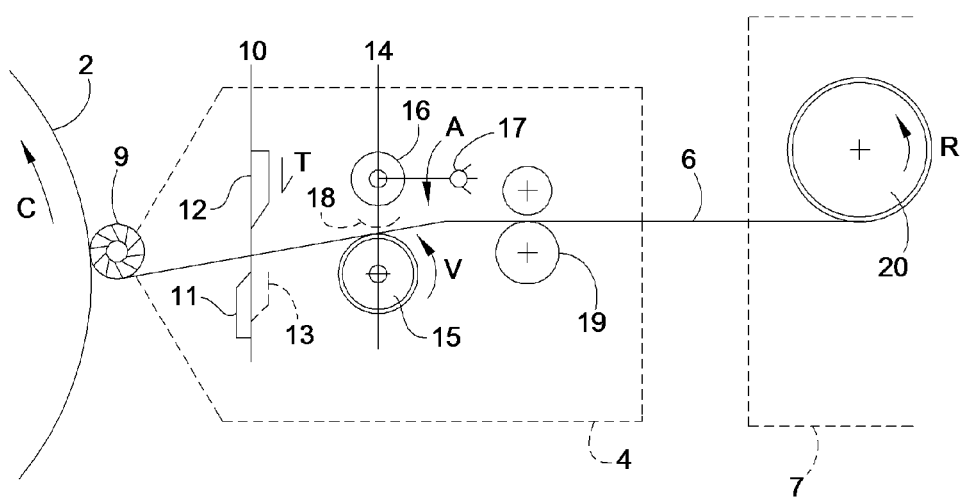
FIG. 2 is a perspective illustration of a first exemplary embodiment of a fiber placement machine tool head apparatus according to the invention.

In a preferred embodiment, the automated fiber placement machine tool head 4 as shown in FIG. 2, allows the passage of the carbon fiber tows 6 toward the feed module 14 through the automated fiber placement machine tool head 4 as guided by the free upper directional wheel 19 and the motorized roller 15. The feed roller 16 creates continuous feed tension as guided by the hinge 17 when rotating along the "A" directional path from its illustrated position to position 18 and in constant tension against the motorized roller 15. Also in a preferred embodiment, the bobbin 20 exerts a correlative tension against any rewind or backward inertia resulting from the cutting action of the upper anvil 12 striking the stationary lower anvil 11 as defined by the lower anvil stroke limit 13 as designed within the cutting module 10. The tows proceed to the main roller 9 for application against the mandrel 2 carrying the part to be formed.

Figure 3:
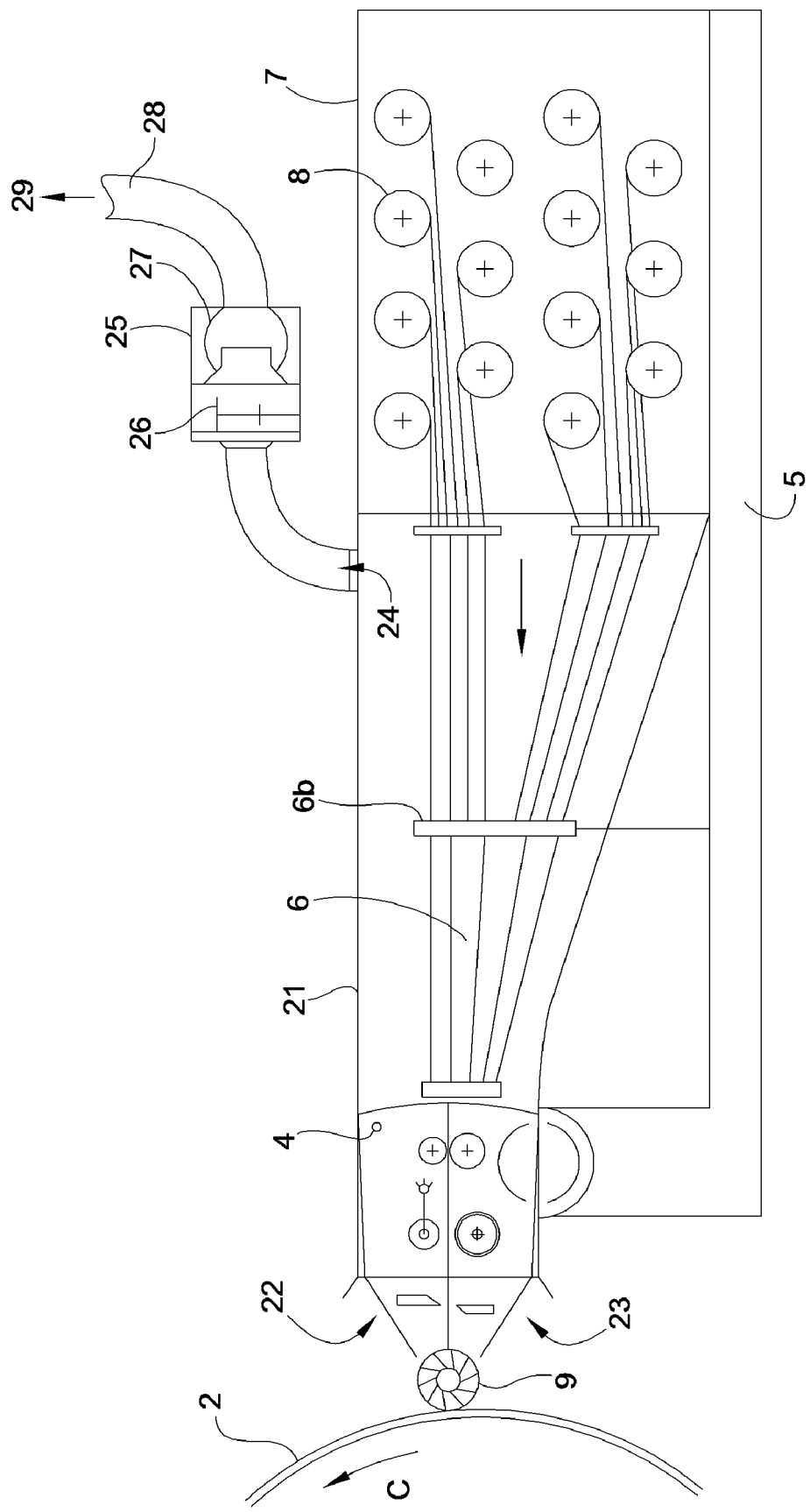
FIG. 3 is a perspective illustration of a first exemplary embodiment of a fiber placement machine tool apparatus on a horizontal ram bearing a self-contained atmospheric evacuation and removal system incorporating at least one or more porous media filters according to the invention.

FIG. 3 displays, in a preferred embodiment, in a horizontal application in relation to a rotating mandrel 2 mold and the entire tow 6 progression from their refrigerated spool carrier 7 and mounting on their individual motorized bobbins 8 that create and maintain proper tow tension, following though the immediate tow support redirect 6b into the automated fiber placement head 4, and encapsulated in the air enclosure 21. This air enclosure 21 is attached to the refrigerated spool carrier 7 with openings 22, 23 just behind the automated fiber placement head 4, yet proximate to the main roller 9. In this embodiment, the openings 22 and 23 are by design limiting the area that allows the passage of air surrounding the entire automated fiber placement head 4 and is designed to enhance the pressure generated by the filtering system 25 incorporated into the air enclosure 21. The movement of the carbon fiber flakes or dust from the tows 6 as they travel from their individual motorized bobbins 8 in the refrigerated spool carrier 7 is facilitated by the air enclosure outlet 24 that channels the air flow into at least the one porous media filter 26 or possibly multiple porous media filters placed in the filtering system 25. The vacuum evacuation of the ambient flakes or dust contained within the air enclosure 21 and removed through the air enclosure outlet 24 is the result of the blower fan 27 operation which simultaneously pulls the carbon fiber flakes and dust into the porous media filter(s) 26 and exhausts the air through the air outlet 28 in the direction illustrated by arrow 29. In one embodiment, the air flow induced by the blower fan 27 is not less than five cubic feet per minute.

Figure 4:
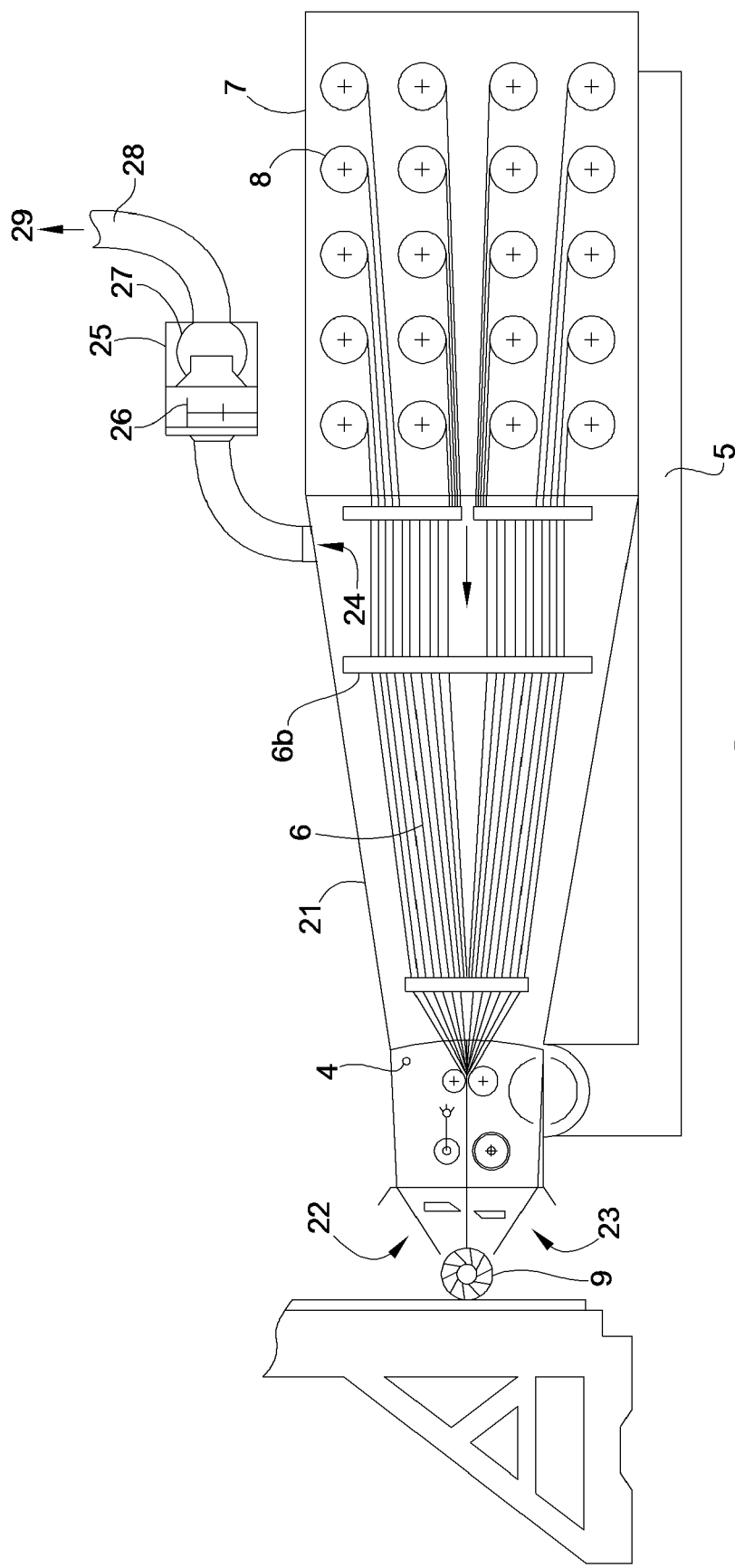
FIG. 4 is a perspective illustration of a first exemplary embodiment of a fiber placement machine tool apparatus on a horizontal ram bearing a self-contained atmospheric evacuation and removal system incorporating at least one or more porous media filters in relation to a stationary tablet mold application, according to the invention.

FIG. 4 in a preferred embodiment, in a horizontal application in relation to a stationary tablet mold, displays the entire tow 6 progression from their refrigerated spool carrier 7 and mounting on their individual motorized bobbins 8 that create and maintain proper tow tension, following though the immediate tow support redirect 6b into the automated fiber placement head 4, encapsulated in the air enclosure 21. This air enclosure 21 is attached to the refrigerated spool carrier 7 with openings 22, 23 just behind the automated fiber placement head 4, yet proximate to the main roller 9. In this embodiment the openings 22 and 23, are by design limiting the area that allows the passage of air surrounding the entire automated fiber placement head 4 and is designed to enhance the pressure generated by the filtering system 25 incorporated into the air enclosure 21. The movement of the carbon fiber flakes or dust from the tows 6 as they travel from their individual motorized bobbins 8 in the refrigerated spool carrier 7 is facilitated by the air enclosure outlet 24 that channels the air flow into at least the one porous media filter 26 or possibly multiple porous media filters placed in the filtering system 25. The vacuum evacuation of the ambient flakes or dust contained within the air enclosure 21 and removed through the air enclosure outlet 24 is the result of the blower fan 27 operation which simultaneously pulls the carbon fiber flakes and dust into the porous media filter(s) 26 and exhausts the air through the air outlet 28 in the direction illustrated by arrow 29.

Figure 5:
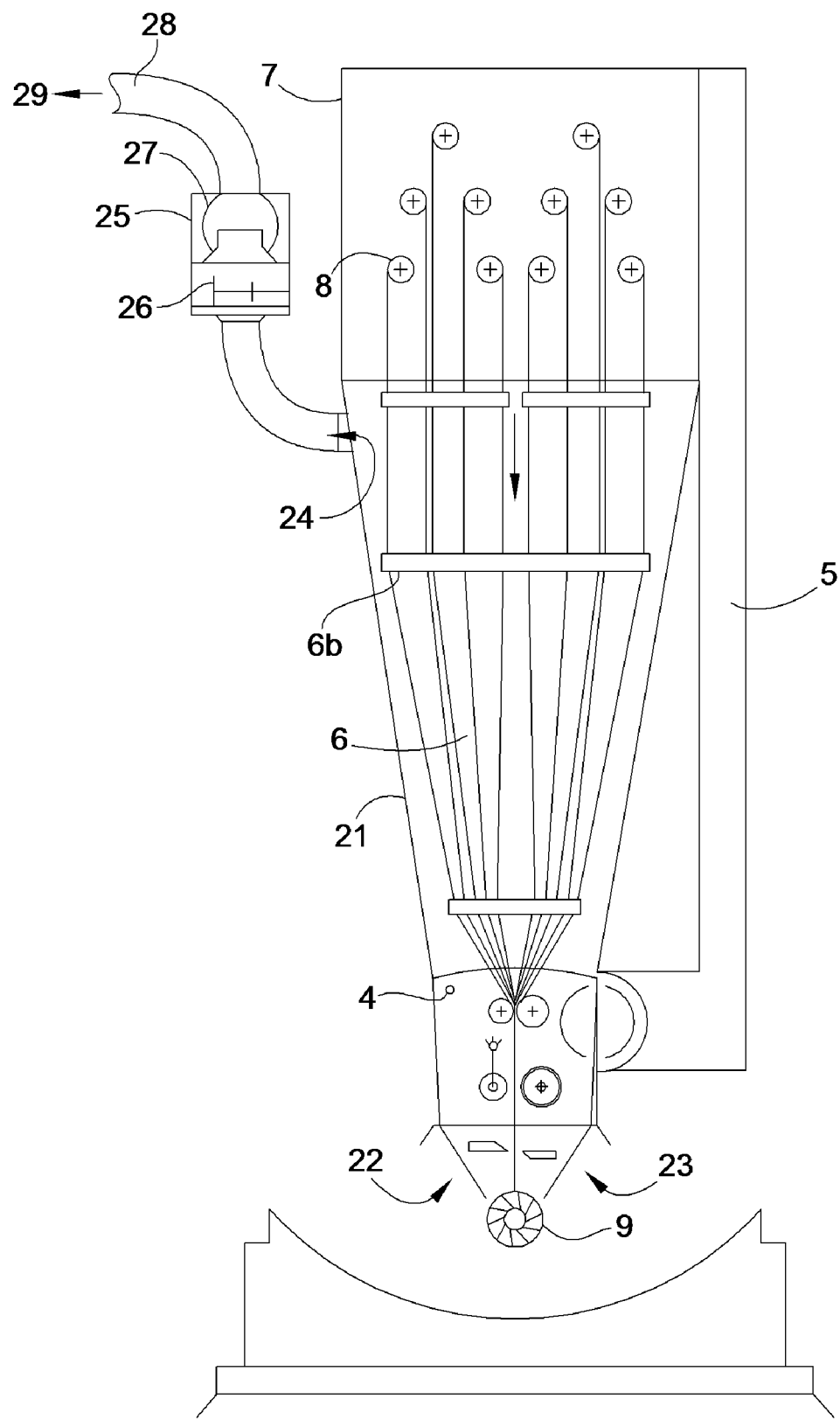
FIG. 5 is a perspective illustration of a first exemplary embodiment of a fiber placement machine tool apparatus on a vertical ram bearing a self-contained atmospheric evacuation and removal system incorporating at least one or more porous media filters in relation to a stationary tablet mold application, according to the invention.

FIG. 5 in a preferred embodiment, in a vertical application, in relation to a concave mold mounted on a stationary tablet, displays the entire tow 6 progression from their refrigerated spool carrier 7 and mounting on their individual motorized bobbins 8 that create and maintain proper tow tension, following though the immediate tow support redirect 6b into the automated fiber placement head 4, is encapsulated in the air enclosure 21. This air enclosure 21 is attached to the refrigerated spool carrier 7 with openings 22, 23 just behind the automated fiber placement head 4, yet proximate to the main roller 9. In this embodiment, the openings 22 and 23, are by design limiting the area that allows the passage of air surrounding the entire automated fiber placement head 4 and are designed to enhance the pressure generated by the filtering system 25 incorporated into the air enclosure 21. The movement of the carbon fiber flakes or dust from the tows 6 as they travel from their individual motorized bobbins 8 in the refrigerated spool carrier 7 is facilitated by the air enclosure outlet 24 that channels the air flow into at least the one porous media filter 26 or possibly multiple porous media filters placed in the filtering system 25. The vacuum evacuation of the ambient flakes or dust contained within the air enclosure 21 and removed through the air enclosure outlet 24 is the result of the blower fan 27 operation which simultaneously pulls the carbon fiber flakes and dust into the porous media filter(s) 26 and exhausts the air through the air outlet 28 in the direction illustrated by arrow 29.

Figure 6:
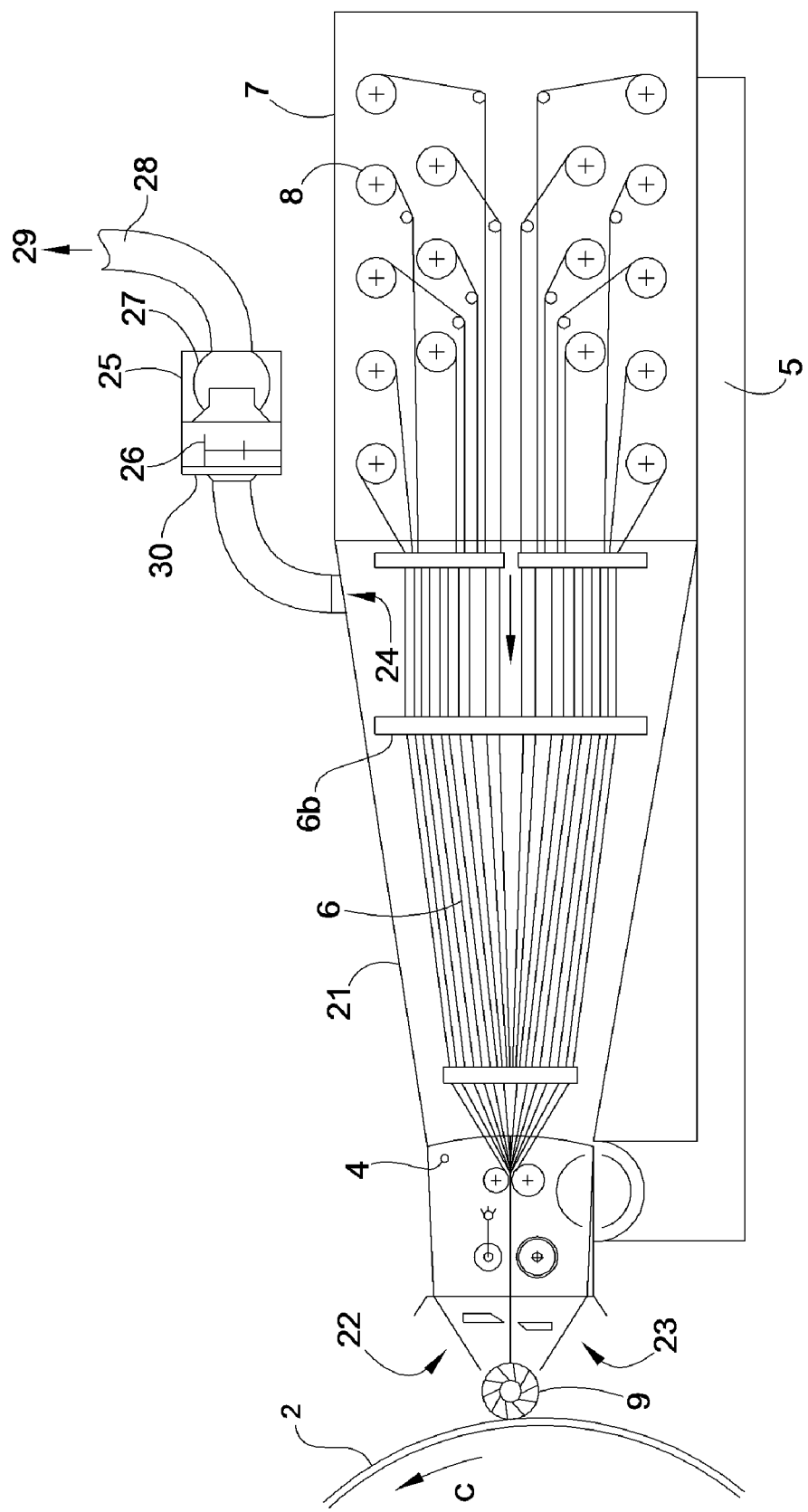
FIG. 6 is a perspective illustration of a first exemplary embodiment of a fiber placement machine tool apparatus on a horizontal ram bearing a self-contained atmospheric evacuation and removal system with the inclusion of an electrostatically charged filter apparatus preceding the porous media filter or filters according to the invention.

FIG. 6 in a preferred embodiment, in a horizontal application in relation to a rotating mandrel 2 mold, displays the entire tow 6 progression from their refrigerated spool carrier 7 and mounting on their individual motorized bobbins 8 that create and maintain proper tow tension, following through the immediate tow support redirect 6b into the automated fiber placement head 4, is encapsulated in the air enclosure 21. This air enclosure 21 is attached to the refrigerated spool carrier 7 with openings 22, 23 just behind the automated fiber placement head 4, yet proximate to the main roller 9. In this embodiment, the openings 22 and 23, are by design limiting the area that allows the passage of air surrounding the entire automated fiber placement head 4 and is designed to enhance the pressure generated by the filtering system 25 incorporated into the air enclosure 21. The movement of the carbon fiber flakes or dust from the tows 6 as they travel from their individual motorized bobbins 8 in the refrigerated spool carrier 7 is facilitated by the air enclosure outlet 24 that channels the air flow into at least the one porous media filter 26 or possibly multiple porous media filters placed in the filtering system 25. The removal of any ambient dust is aided by the electrostatic apparatus 30 while the vacuum evacuation of airborne dust contained within the air enclosure 21 and removed through the air enclosure outlet 24 is the result of the blower fan 27 operation which simultaneously pulls the carbon fiber flakes and dust into the porous media filter(s) 26 and exhausts the air through the air outlet 28 in the direction of arrow 29. The inclusion of the electrostatic apparatus 30 is particularly beneficial when non-resin embedded fiber tows are utilized. In one embodiment, the electrostatic apparatus 30 is included and its use is user selectable, e.g., based on whether non-resin embedded fiber tows or resin embedded tows are being used.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of evacuating carbon fiber flakes or dust from an automated carbon fiber placement machine tool head apparatus having a refrigerated spool carrier attached to a positioner cradle that moves along at least two axes, a carbon fiber tow path and redirect apparatus positioned between the refrigerated spool carrier and the automated fiber placement head apparatus, the automated fiber placement head apparatus having at least one free upper direction wheel, at least one motorized roller, at least one feed roller, at least one mechanism designed and designated to cut or sever the carbon fiber tows according to an attendant computer software design instruction, and a main roller for applying the carbon fiber tows to a mold; the method comprising the steps of:
    enclosing the carbon fiber tow path from the refrigerated spool carrier to the automated fiber placement head apparatus in an air enclosure having at least one opening proximate the main roller, the enclosure having an air enclosure outlet;
    providing an air flow from the at least one opening over the main roller and the fiber tow path to the air enclosure outlet;
    filtering the air flow exiting the air enclosure outlet to trap carbon fiber flakes or dust.

2. The method of claim 1, wherein the step of providing the air flow and filtering the air flow comprise the step of energizing a fan to pull the carbon fiber flakes and dust into the air enclosure outlet.

3. The method of claim 2, wherein the step of filtering comprises the step of providing at least one porous media filter to trap the carbon fiber flakes and dust.

4. The method of claim 2, wherein the step of filtering comprises the step of providing an electrostatically charged filter device positioned adjacent to the fiber tow path prior to the tows reaching the automated fiber placement head apparatus.

5. The method of claim 2, wherein the step of filtering comprises the steps of providing at least one porous media filter to trap the carbon fiber flakes and dust and providing an electrostatically charged filter device positioned adjacent to the fiber tow path prior to the tows reaching the automated fiber placement head apparatus and preceding the at least of porous media filter and air outlet in the direction of the air flow.

6. The method of claim 1, further comprising the step of exhausting the air flow after the step of filtering to ambient.

7. A method of evacuating carbon fiber flakes or dust from a carbon fiber placement machine tool head, the method comprising the steps of:
    encapsulating with a dust impermeable enclosure a carbon fiber tow travel path from a spool carrier through a redirect apparatus to the carbon fiber placement machine tool head;
    providing a limited, yet equidistant clearance between the dust impermeable enclosure and around a perimeter of the automated fiber placement head apparatus; and
    inducing an air flow from the clearance toward the spool carrier;
    filtering the air flow near the spool carrier to remove carbon flakes or dust from the air flow; and
    exhausting the air flow after the step of filtering.

8. The method of claim 7, wherein the step of inducing the air flow comprises the step of inducing an air flow of not less than five cubic feet per minute from the clearance toward the spool carrier.

9. The method of claim 7, wherein the step of filtering the air flow comprises the step of providing at least one porous media filter to trap the carbon fiber flakes and dust in the air flow.

10. The method of claim 7, wherein the step of filtering comprises the step of providing an electrostatically charged filter device positioned adjacent to the carbon fiber placement machine tool head.

11. The method of claim 7, wherein the step of filtering comprises the steps of providing at least one porous media filter to trap at least the carbon fiber flakes and providing an electrostatically charged filter device positioned adjacent the carbon fiber placement machine tool head and preceding the at least of one porous media filter to trap at least the dust.

12. A carbon fiber placement machine tool, comprising:
    a refrigerated spool carrier having a plurality of spools positioned thereon;
    an automated fiber placement head having at least one free upper direction wheel, at least one motorized roller, at least one feed roller, at least one mechanism designed and designated to cut or sever the carbon fiber tows according to an attendant computer software design instruction, and a main roller for applying the carbon fiber tows to a mold;
    a carbon fiber tow redirect apparatus positioned between the refrigerated spool carrier and the automated fiber placement head;
    an enclosure coupled to the refrigerated spool carrier and extending a length of a carbon fiber tow path from the refrigerated spool carrier to the automated fiber placement head, the enclosure having at least one opening proximate the main roller and an air enclosure outlet positioned in proximity to the refrigerated spool carrier;
    a fan positioned relative to the enclosure to induce an air flow over the main roller and the fiber tow path to the air enclosure outlet; and
    a filtering system operably positioned to filter the air flow induced by the fan to trap carbon fiber flakes or dust.

13. The carbon fiber placement machine tool of claim 12, wherein the fan is positioned to draw air out of the air enclosure outlet.

14. The carbon fiber placement machine tool of claim 13, wherein the filtering system comprises at least one porous media filter positioned between the fan and the air enclosure outlet.

15. The carbon fiber placement machine tool of claim 14, wherein the filtering system comprises an electrostatically charged filter device positioned adjacent the automated fiber placement head.

16. The carbon fiber placement machine tool of claim 12, wherein the filtering system comprises an electrostatically charged filter device positioned adjacent the automated fiber placement head.

17. The carbon fiber placement machine tool of claim 12, wherein the at least one opening is formed by a clearance between an end of the enclosure and a perimeter of the automated fiber placement head.

18. The carbon fiber placement machine tool of claim 12, further comprising a positioner cradle that moves along at least two axes supporting the refrigerated spool carrier.

19. The carbon fiber placement machine tool of claim 18, further comprising a rotatable mandrel positioned in proximity to the automated fiber placement head, and wherein the at least one opening is formed by a clearance between an end of the enclosure, a perimeter of the automated fiber placement head, and a surface of the rotatable mandrel when the automated fiber placement head is laying tows thereon.

20. The carbon fiber placement machine tool of claim 18, further comprising a stationary tablet mold positioned in proximity to the automated fiber placement head, and wherein the at least one opening is formed by a clearance between an end of the enclosure, a perimeter of the automated fiber placement head, and a surface of the stationary tablet mold when the automated fiber placement head is laying tows thereon.

21. The carbon fiber placement machine tool of claim 12, further comprising an electrostatically charged filter apparatus positioned immediately adjacent to the carbon fiber tow path prior to the tows reaching the automated fiber placement head to remove carbon fiber dust prior to the automated fiber placement head.

22. The carbon fiber placement machine tool of claim 12, wherein the filtering system utilizes an electrostatic charge to trap the dust.

23. The carbon fiber placement machine tool of claim 12, wherein the filtering system utilizes a filter having a porous media.

24. An apparatus, comprising an automated fiber placement head apparatus utilizing a dust impermeable encapsulating enclosure of an entire carbon fiber tow travel path from a refrigerated spool carrier and toward a redirect apparatus location, having a vacuum evacuation of ambient flakes or dust contained within the enclosure and removed through an enclosure outlet as the result of a fan operation which simultaneously pulls the flakes and dust into at least one of a porous media filter and an electrostatically charged filter apparatus preceding the at least one porous media filter and air outlet for dust removal, positioned immediately adjacent to the fiber tow path prior to tows reaching the automated fiber placement head apparatus and exhausts the air through an air outlet, operatively directed in bilateral or unilateral modes dependent upon the resin embedded or non-resin embedded nature of the carbon fiber material in use for the tows and such status being operatively integrated into an overall function of the automated carbon fiber placement apparatus by means of an attendant computer software program engaged at an operator's discretion.

* * * * *